Dec. 3, 1963  R. A. GOULD  3,112,580
LAMINATED SIDING
Filed Sept. 23, 1960  3 Sheets-Sheet 1
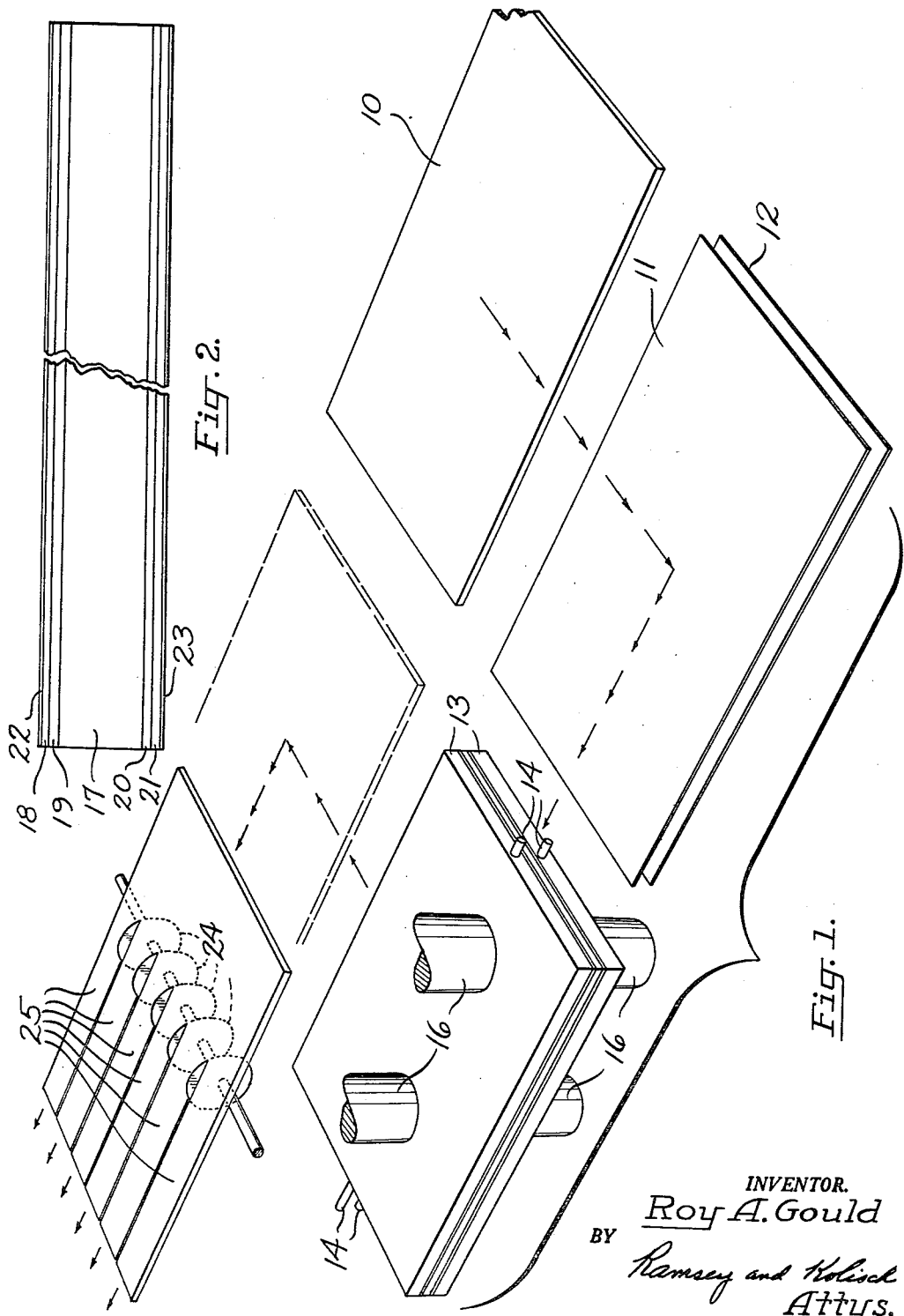
INVENTOR.
Roy A. Gould
BY Ramsey and Kolisch
Attys.

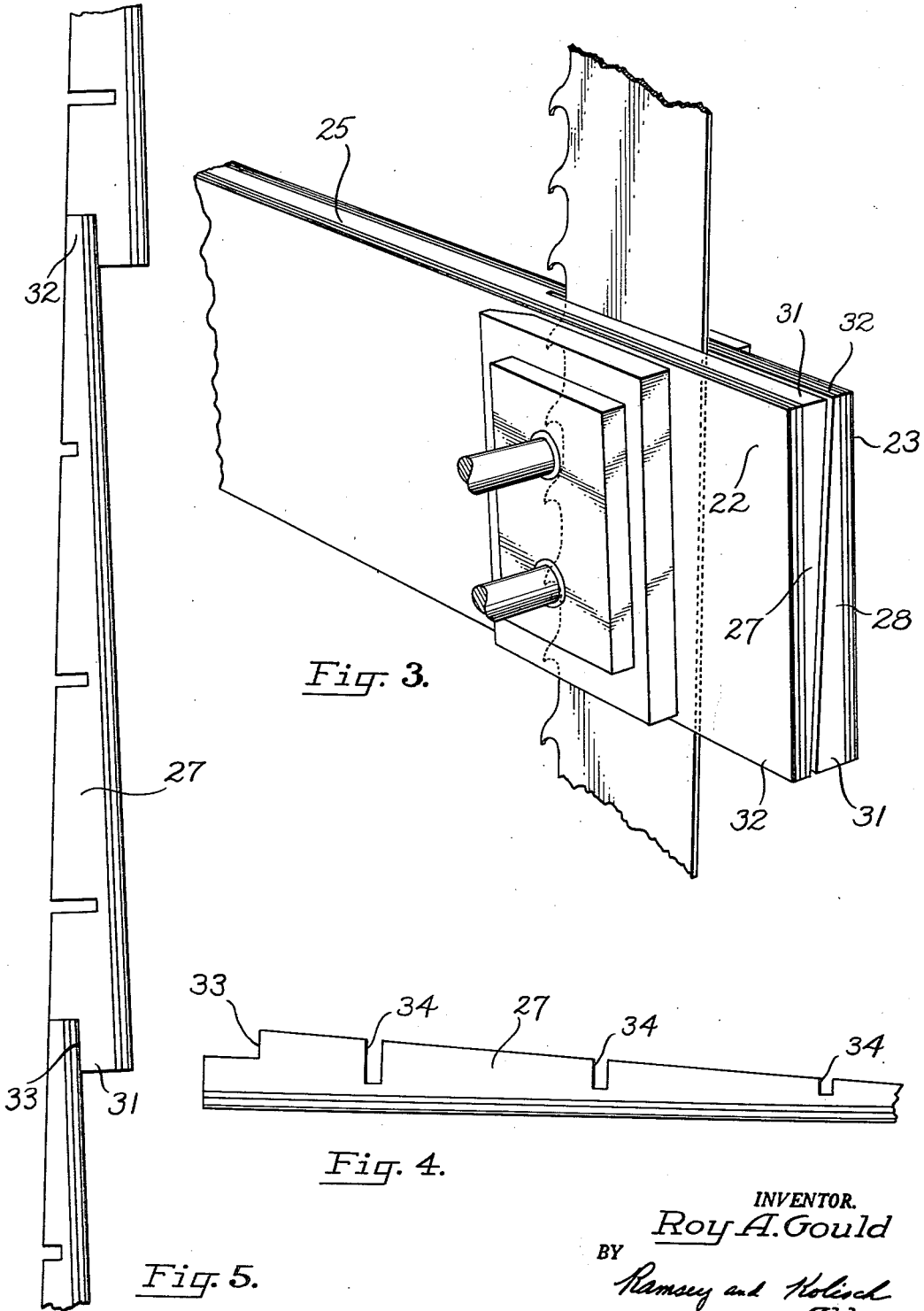

Dec. 3, 1963   R. A. GOULD   3,112,580
LAMINATED SIDING
Filed Sept. 23, 1960   3 Sheets-Sheet 3
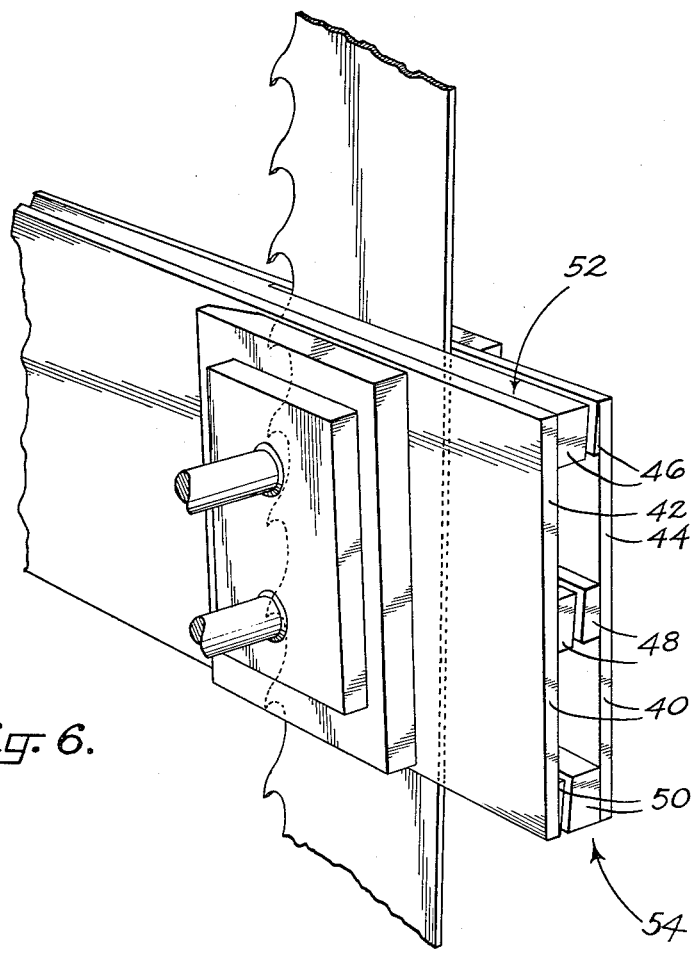
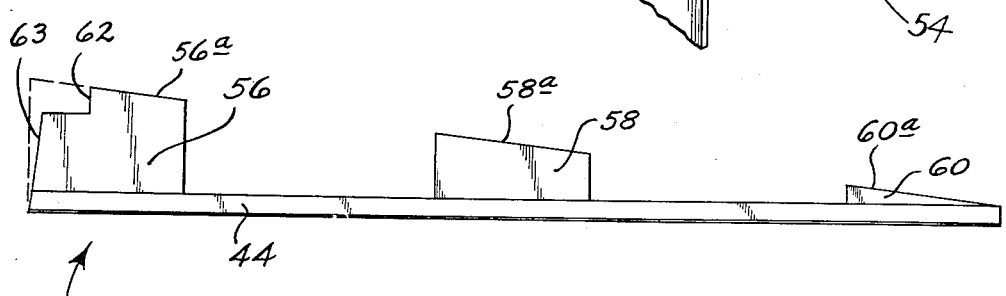
INVENTOR.
Roy A. Gould
BY Ramsey and Kolisch
Attys.

United States Patent Office 3,112,580
Patented Dec. 3, 1963

3,112,580
LAMINATED SIDING
Roy A. Gould, Portland, Oreg., assignor to Diamond Lumber Company, Portland, Oreg., a corporation of Oregon
Filed Sept. 23, 1960, Ser. No. 58,879
6 Claims. (Cl. 50—240)

This invention relates to building materials, and more particularly to a novel form of siding or building strip of the type that ordinarily may be used in finishing the outside of a building.

Generally it is an object of this invention to provide an improved form of building strip or siding, that may be produced economically, and that also is attractive, strong, and durable, and can withstand for relatively long periods of time the weathering effects to which a piece of siding ordinarily is subjected.

A concept bottoming the invention is the provision in a piece of siding of a rigid, warp-resistant board of uniform thickness for the sloping outer part of the siding, and joined to the back of this board means substantially free of stress-producing tendencies giving a slope to the board, whereby the outside of the siding has the usual slant when the siding is nailed in place. In one form of the invention, the warp-resistant board comprises an elongated piece of composition board (such as hardboard or particle board), such having no regular grain pattern, and the means giving a slope to the board comprises a backing joined to the rear face of the composition board made up of spaced-apart furring strips with grain extending longitudinally of the siding. According to another embodiment of the invention, the rigid, warp-resistant portion of the siding comprises a laminated cross-bonded strip with multiple plies and with the grain of the plies extending across each other (so that there is no regular grain pattern in the strip), and the backing may comprise a solid strip of wood with grain extending along the length of the siding and stress-relieved along the length of the siding in a direction that parallels the grain of the backing.

In recent years it has become more and more a standard practice to coat lumber products with a resinous overlay, to mask imperfections and to produce a smooth coating. Exemplary of such overlays are commercially available resin-impregnated matted pulp or paper sheets, that may be bonded over the face of a piece of lumber by the application of heat and pressure. Such overlays may increase the attractiveness and surface durability of a lumber product, but unfortunately, the use of the resinous materials has been accompanied by undesirable warping and buckling effects in the products treated.

Apparently, one of the explanations for this behavior is that the heat and pressure employed for curing the resinous overlay has the effect of compressing, and drying up, and thereby shrinking, those portions of the lumber product lying adjacent the overlay. After curing of the resin, when the resinous overlay becomes set and bonded to the lumber and the lumber subsequently cools and expands, the resinous overlay tends to create stresses in the lumber by reason of the fact that it is now clinging to the lumber so as to resist dimensional changes in the lumber. Warping and twisting also occurs during the use of the product through expansion and contraction of the wood in the product due to humidification changes. Dimensional changes in the wood due to changes in humidity are not accompanied by a corresponding expansion or contraction of the resinous coating, so that again the presence of the resinous overlay tends to set up stresses along the interface between the resin coating and the wood likely to cause warping.

The siding of this invention, that includes a rigid, warp-resistant board or supporting strip portion and a stress-free backing joined to the rear side of this portion, is particularly adapted for the application of such resinous overlays without the usual warping and buckling effects noted. The supporting strip portion absorbs and withstands stresses resulting from adding the overlay, and the function of the backing primarily is to impart the desired slope to the siding without introducing stresses to the supporting strip portion that would unbalance it.

Thus, a more specific object of the invention is to provide a novel piece of siding that has a resinous overlay over its exterior face, and that is characterized by a construction whereby warping and buckling tendencies in the siding are substantially eliminated.

Another object of the invention is to provide a novel piece of siding that includes a rigid warp-resistant board as its outer side, and that is readily mounted on a wall, without introducing stresses to the siding where it is nailed in place.

A further object of the invention is to provide a novel piece of siding that has superior insulating properties, by reason of captive air spaces provided the siding.

This invention is a continuation-in-part of application Serial No. 655,062 entitled "Building Strip," filed April 25, 1957, now abandoned.

Other features, objects, and advantages are attained by the invention, and these will become apparent as the following description is read in conjunction with the accompanying drawings, wherein:

FIG. 1 is a simplified sketch, in flow form, illustrating a method of preparing elongated strips having a resinous overlay over opposite faces, such as may be used in preparing pieces of siding as contemplated in one embodiment of the invention;

FIG. 2 is a side view of an elongated strip prepared using the method illustrated in FIG. 1;

FIG. 3 illustrates how an elongated strip prepared as in FIG. 1 may be cut by a diagonal cut, to form strips with a tapered cross section;

FIG. 4 is a view of the end of a finished building strip or piece of siding as contemplated according to one embodiment;

FIG. 5 shows the siding nailed in place on the side of a building;

FIG. 6 is a view similar to FIG. 3, but illustrating the diagonal cutting of an elongated strip constructed according to a modified form of the invention; and FIG. 7 illustrates a finished piece of siding prepared from diagonally cut strips prepared as in FIG. 6.

Considering first of all the embodiment of the invention illustrated in FIGS. 1-5, where a resinous overlay is provided over the exterior face of a piece of siding, in the manufacture of such siding it has been found convenient first to prepare a laminated wood panel with a resinous coating deposited over and bonded to each of its broad faces. A panel having such an overlay over both of its faces tends to be more resistant to warping, twisting and buckling during hot pressing of the same. That is to say, by coating both faces with a resinous overlay, stresses set up by dehumidification and compression of surface layers of wood adjacent the resinous coating tend to balance themselves on opposite sides of the panel. When the panel subsequently is cooled, the panel tends to lie flat.

Thus, and with references to FIG. 1, a sheet of plywood is indicated at 10. Resinous sheets to be applied to opposite faces of plywood sheet 10 are indicated at 11, 12. In the production of the coated panel, heat and pressure are applied to the resinous sheets and the panel placed therebetween. Such may be done using platens 13 that are pressed together by press elements 16. The platens 13 are heated by steam passing through conduits 14. Conventional procedures may be used in bonding the resinous overlays to the panel, and these are well known. Patents which illustrate such procedures are Birmingham 2,343,740; and McClary, 2,418,233.

The resinous overlay applied to the outer faces of the panel may take any of a number of variety of different forms. Currently, cloth, paper, or matted pulp sheets impregnated with a thermosetting resinous material, such as a thermosetting phenol formaldehyde resin, are known that may be applied to plywood panels so as to coat them. Illustrative of such resinous coating material are sheets prepared from felted or loosely matted unrefined ground wood impregnated with a cresylic acid formaldehyde partial condensation product, described in the Birmingham patent referred to above. U.S. Patents 2,442,422 to Loetscher, and 2,448,357 to Craig, illustrate other resin impregnated fiberous sheets such as may be employed in preparing the resinous coatings.

In the drawings, a five-ply plywood panel is shown, that has a relatively thick center core 17, and four relatively thin veneer layers 18, 19, 20, 21 bonded to opposite sides of core 17. The grain of each layer of wood in the panel extends transversely of the grain of adjacent layers, i.e., the layers are cross-bonded. Thus, in FIG. 2, if the grain of the two outer veneer layers 18, 21 runs parallel to the plane of the page, the grain of the core layer 17 also runs parallel to the plane of the page, and the grain of intermediate veneer layers 19 and 20 runs perpendicular to the plane of the page. When the panel emerges from the hot press, the panel has bonded to the outer faces of outer layers 18, 21, coatings 22 and 23 that formerly were resin sheets 11 and 12.

After the resin coating has been applied and the panel cooled, the panel is divided by series of parallel cuts or kerfs to produce a series of elongated strips generally corresponding in length and width to the length and width of a finished piece of siding. The strips are cut from the panel by cutting the panel in the direction of the grain of the outer layers of veneer in the panel. In FIG. 1, saws 24 are cutting the panel into plural strips 25. By cutting the strips from the panel in this manner, the grain of the veneer directly beneath the resin overlay runs the length of the strip and so does the grain of core layer 17. This provides maximum resistance in each strip to warping or buckling longitudinally of the strip (warping in a strip of wood occurs for the most part across the grain of the wood). Further, as will be apparent below, by such cutting, siding prepared from the strips has grain that extends longitudinally of the siding, which is advantageous.

Referring to FIG. 3, to make finished siding from a strip 25, the strip is divided into two pieces, by cutting the strip lengthwise and between its edges. A diagonal cut is used between the edges of the strip, so that two complementary, wedge-shaped pieces 27, 28 are produced. Ordinarily it is convenient to divide the strip into two pieces using a band saw as shown. It should be noted that the diagonal cut is made entirely through core 17 and without cutting veneer layers on either side.

Wedge-shaped pieces 27 and 28, which are similar to each other, each have a relatively thick butt edge 31, and a narrower tongue or lead edge 32. A rabbet or groove 33 is cut or routed out along the butt edge of each piece, such rabbet opening to the side of the piece opposite the side having the resin overlay thereon. Rabbet 33 fits snugly over tongue 32 of a similar piece, as illustrated in FIG. 5. Rabbet or groove 33 is cut out of wood that formerly was the core layer of the panel, without cutting into the laminated portions of the wedge-shaped piece.

By splitting strips 25 in the manner described, it will be noted that a building strip results comprising an elongated body having a thermoset resinous overlay bonded over one side forming the exterior face of the siding, and directly beneath the overlay and supporting the overlay a laminated cross-bonded supporting strip or board portion made up of two wood plies that are uniform in thickness, parallel to each other, and parallel to the plane of the resinous overlay. There being no regular grain pattern in the supporting strip portion (the grain of the two wood plies extending across each other), the supporting strip portion is wrap-resistant and rigid. The supporting strip portion provides an ideal mounting for the overlay, and absorbs while withstanding internal stresses produced thereby. The beveled wood strip behind the two-ply supporting strip portion provides a backing for the siding. The tapered transverse cross section of the backing imparts an incline to the front face of the siding with the siding secured on a wall. The backing, it should be noted, is nonlaminated, which is to say it has unidirectional grain structure.

To make a finished piece of siding from a wedge-shaped piece 27, 28, stress-relieving grooves 34 are cut in the backing strip that parallel the grain of the strip. These stress-relieving grooves inhibit wraping transversely of the siding. It is important that the stress-relieving grooves be cut only in the backing strip, and not extend into the supporting strip in front of it, as this would serve to weaken the supporting strip and unbalance stresses therein. Preferably the stress-relieving grooves extend into the backing strip a distance such that their inner edges define substantially a common plane parallel to the supporting strip and the overlay bonded thereon.

With reference now to FIGS. 6 and 7, illustrating a modification of the invention, here a strip 40 has been cut from a larger panel in the same manner as strip 25 discussed in connection with the embodiment of the invention illustrated in FIGS. 1–5. Instead of comprising a plywood panel with resinous overlays bonded to opposite faces, the panel used in making strip 40 comprises a pair of hardboard sheets spaced apart and bonded to opposite faces of elongated wooden strips. When the panel is cut into strips, strips such as strip 40 result having elongated pieces of hardboard 42, 44 (such having no regular grain pattern and being rigid and warp-resistant) bonded to opposite faces of wooden strips 46, 48, 50.

To prepare siding from strip 40, it is cut, as with a band saw, with a diagonal cut extending through the wooden strips only. Complementary wedge-shaped pieces 52, 54 are formed, shaped approximately as a finished piece of siding. Each piece has an elongated, rigid and warp-resistant board portion (hardboard piece 44 for wedge-shaped piece 54) with no regular grain pattern and of uniform cross section extending along the length of the siding and forming the outside of the siding. Joined to the rear side or face of this board portion and forming the inside of the siding are elongated supporting portions or furring strips 56, 58, 60, spaced from each other and disposed, one adjacent the top edge, one adjacent the bottom edge, and one between the top and bottom edges of the siding, respectively.

The supporting strip portions or furring strips have flat sides facing the rear of the siding indicated at 56a, 58a, and 60a. These flat sides lie in and define a common plane that is a supporting plane for the siding. Such supporting plane diverges from the board portion of the siding progressing from its top to its bottom edge. The furring strips have grain extending longitudinally of the siding, are relatively narrow, and are unjoined with voids extending between them. Thus, the strips are substantially stress-free, and they function primarily as a means for mounting the siding on a building with the front of the siding having the sloped or inclined position desired.

After cutting strip 40 with a diagonal cut to form wedge-shaped pieces such as pieces 52, 54, the furring strip along the butt edge of each wedge-shaped piece has an outline along the lower edge thereof generally as indicated by the dashed outline portion for strip 56 in FIG. 7. The base of the furring strip may be beveled off as at 63, and a rabbet 62 may be routed out of the rear side of the furring strip that opens to the supporting plane of the siding. Rabbet 62 is shaped snugly to receive the top edge of a similar piece of siding.

The final piece of siding that results has a bottom edge that extends substantially normal to the supporting plane of the siding, so that with the siding nailed to a building the lower edge is obscured from view. When nailed to a building and overlapped with other siding, the board portion of a piece of siding is kept flat and free of stresses in its inclined position, by the furring strips discussed and the supporting plane that they define extending between top and bottom edges of the siding. By providing voids between the furring strips, not only are the stress-producing tendencies of the backing minimized, but also captive air spaces are provided that give the siding desirable insulating properties.

I claim:

1. A piece of beveled siding comprising an elongated, rigid and warp-resistant board portion with no regular grain pattern and of uniform thickness with one side facing the front side of the siding, said board portion extending from the top edge to the bottom edge of the siding, and substantially stress-free means joined to the other side of said board portion which faces the rear side of the siding and defines a rear supporting plane for the siding, said rear supporting plane diverging from said board portion progressing from the top to the bottom edge of the siding, said stress-free means being of wood and having a grain throughout extending along the length of the siding, said stress-free means including elongated wood portions extending along the siding adjacent the top and bottom edges thereof, and means defining longitudinal voids between said elongated wood portions extending substantially the entire length of the siding and paralleling the grain of the wood of the stress-free means so as to relieve stresses therein.

2. A piece of beveled siding comprising an elongated, rigid and warp-resistant board portion with no regular grain pattern and of uniform thickness with one side facing the front side of the siding, said board portion extending from the top edge to the bottom edge of the siding, and substantially stress-free means joined to the other side of said board portion which faces the rear side of the siding and defines a rear supporting plane for the siding, said rear supporting plane diverging from said board portion progressing from the top to the bottom edge of the siding, said stress-free means being of wood and having a grain throughout extending along the length of the siding, said stress-free means comprising an elongated wood upper supporting portion extending along the top edge of the siding with a flat side forming the rear of the siding and in said supporting plane, an elongated wood lower supporting portion extending along the bottom edge of the siding with a flat side forming the rear of the siding and in said supporting plane, means defining longitudinal voids between said upper and lower supporting portions extending along substantially the entire length of the siding and paralleling the grain of the stress-free means so as to relieve stresses therein, and a rabbet formed in said lower supporting portion extending along the length thereof and opening to said supporting plane and shaped snugly to receive the top edge of a similar piece of siding.

3. A piece of beveled siding comprising an elongated rigid and warp-resistant board portion with no regular grain pattern and of uniform thickness with one side facing the front side of the siding, said board portion extending from the top edge to the bottom edge of the siding, and substantially stress-free means joined to the other side of said board portion which faces the rear side of the siding and defines a rear supporting plane for the siding, said rear supporting plane diverging from the board portion progressing from the top to the bottom edge of the siding, said stress-free means comprising plural wood furring strips along the top edge and bottom edge, and approximately intermediate the top and bottom edges of the siding, said furring strips being separated one from another by voids extending along the length of the siding, the grain of the furring strips extending longitudinally of the siding, said furring strips having sides facing the rear side of the siding that lie in and define said supporting plane, and a rabbet formed in the furring strip along the bottom edge of the siding that opens to said supporting plane and is shaped snugly to receive the top edge of a similar piece of siding.

4. A building strip comprising an elongated body portion, said body including a laminated wood cross-bonded supporting strip of uniform thickness extending from the top edge to the bottom edge of the building strip and along one side of said body portion, said body portion further including a nonlaminated wood backing strip with the grain of the strip running uniformly in one direction through the strip bonded to said supporting strip and extending along the other side of said body portion, the laminae of said supporting strip being parallel to each other and each of the laminae having substantially a uniform thickness, said backing strip having a tapered transverse cross section and the outer face thereof forming the back face of said building strip, stress-relieving grooves formed in said backing strip along the grain of the strip and inwardly from the edges thereof, and a thermoset resinous overlay bonded to the outer face of said laminated supporting strip forming the front of said building strip, said supporting strip providing a warp-resistant surface mounting said overlay.

5. A building strip comprising an elongated body portion, said body portion including a laminated wood supporting strip of an even number of wood ply layers extending from the top edge to the bottom edge of the building strip and along one side of said body portion, said body portion further including a wood backing strip forming an additional wood layer in the building strip bonded to said supporting strip and extending along the other side of said body portion, the grain of said backing strip running unidirectionally in the backing strip, the grain of each wood layer in said building strip running transversely of the grain of adjacent wood layers and the grain of the outermost wood layers extending longitudinally along the length of said building strip, each of the wood ply layers of said supporting strip having a substantially uniform thickness, said backing strip having a tapered transverse cross section and the outer face thereof forming the back face of said building strip, stress-relieving grooves formed in said backing strip along the grain of the strip and inwardly from the edges thereof, and a thermoset resinous overlay bonded to the outer face of said laminated supporting strip forming the front of said building strip, said supporting strip providing a warp-resistant surface mounting said overlay.

6. A piece of beveled siding comprising an elongated, rigid, and warp-resistant board portion with no regular grain pattern and of uniform thickness extending from the top edge to the bottom edge of the siding, said board portion having one side facing the front of the siding and its other side facing the back of the siding, and substantially stress-free means joined to said other side of said board portion with the rear surface defining a rear supporting plane on the back side of the siding, said rear supporting plane diverging from said board portion progressing from the top to the bottom edge of the siding, said stress-free means being of wood and having a grain throughout extending along the length of the siding, said stress-free means including elongated wood portions extending along the siding adjacent the top and bottom edges thereof, said stress-free means further including means defining longitudinal voids between said elongated wood portions extending substantially the entire length of the siding and paralleling the grain of the wood of the stress-free means so as to relieve stresses therein, and a resinous overlay bonded to said one side of said warp-resistant board portion, said board portion providing a warp-resistant surface mounting said overlay.

References Cited in the file of this patent

UNITED STATES PATENTS

| | | | |
|---|---|---|---|
| 2,390,087 | Fink | Dec. 4, | 1945 |
| 2,565,251 | Malmstrom | Aug. 21, | 1951 |
| 2,569,831 | Ryall | Oct. 2, | 1951 |
| 2,659,938 | Crowther | Nov. 24, | 1953 |
| 2,661,511 | Wyerhaeuser | Dec. 8, | 1953 |
| 2,782,468 | Leonardson et al. | Feb. 26, | 1957 |
| 2,835,932 | Walton | May 27, | 1958 |
| 2,878,530 | Lindstrom | Mar. 24, | 1959 |

FOREIGN PATENTS

| | | | |
|---|---|---|---|
| 961,306 | Germany | Apr. 4, | 1957 |
| 573,839 | Canada | Apr. 14, | 1959 |